United States Patent [19]
Pajtas et al.

[11] Patent Number: 5,265,659
[45] Date of Patent: Nov. 30, 1993

[54] NON-PNEUMATIC TIRE WITH RIDE-ENHANCING INSERT

[75] Inventors: Scott R. Pajtas, Highland; Luis G. Balderas-Ariza, Farmington Hills, both of Mich.

[73] Assignee: Uniroyal Goodrich Licensing Services, Inc., Akron, Ohio

[21] Appl. No.: 853,371

[22] Filed: Mar. 18, 1992

[51] Int. Cl.$^5$ .............................................. B60C 7/12
[52] U.S. Cl. .................................. 152/329; 152/323; 152/7
[58] Field of Search ............ 152/1, 5, 7, 6, 8, 9, 152/11, 12, 323, 324, 325, 327, 328, 329

[56] References Cited

U.S. PATENT DOCUMENTS

| | | | |
|---|---|---|---|
| 1,573,391 | 2/1926 | Hibner | 152/327 X |
| 1,666,234 | 4/1928 | Cullen | 152/329 X |
| 4,590,980 | 5/1986 | Kuhn | 152/323 |
| 4,832,098 | 5/1989 | Palinkas et al. | 152/7 |
| 4,921,029 | 5/1990 | Palinkas et al. | 152/7 X |

FOREIGN PATENT DOCUMENTS

531  1/1896  United Kingdom ............... 152/9

Primary Examiner—Russell D. Stormer
Attorney, Agent, or Firm—A. D. Lobo; A. A. Csontos

[57] ABSTRACT

The relatively harsh "ride" of a non-pneumatic tire ("NPT") is greatly improved by a ring of elastomeric material referred to as a "ride-enhancing insert" ("RI"). The RI is pre-positioned on the outer surface of a wheel rim on which the NPT is to be molded of elastomeric material, most preferably a polyurethane, which is peculiarly well-suited to survive normal use on various vehicles, particularly as a replacement for a conventional spare tire, or "minispare" in an automobile. The RI is surprisingly tolerant of stress and heat loads generated by operation of the NPT/RI. The RI has a large effect on the spring rate of the NPT when deflected over a cleat, and a reduction in spring rate when deflected over a smooth laminar surface. This is of particular importance since the deflection over a cleat is where the improvement in ride is most noticeable. The degree of ride-enhancement can be tailored by choosing the size and shape of the RI, along with the physical properties of the elastomer from which it is formed.

20 Claims, 5 Drawing Sheets

NON-PNEUMATIC TIRE WITH RIDE-ENHANCING INSERT

BACKGROUND OF THE INVENTION

This invention relates to a load-bearing non-expansible non-pneumatic tire ("NPT" for brevity) having an improved "ride" which is due to an annular elastomeric insert, referred to as a "ride-enhancing insert", "ride insert" or "insert" for brevity, because it is captured within the web, either directly beneath the circumferential center line of the web, or as a laminate within the web in which the outer periphery of the insert extends above the circumferential center line of the web. In either case, the insert circumferentially embraces the outer surface of a wheel rim on which the NPT is mounted. The acronym "NPT" is used herein to denote any non-pneumatic tire which comprises a central load-bearing web of elastomeric material.

The structure of the NPT itself is not narrowly critical so long as it includes a load-bearing integral web which has an insert-containing base in common with that of the NPT. Several prior art NPTs have been constructed with load-bearing webs, but NPTs which benefit most from being modified in accordance with this invention are those more fully described in U.S. Pat. No. 4,832,098 to Palinkas and Page, titled "Non-pneumatic Tire with Supporting and Cushioning Means"; U.S. Pat. No. 4,921,029 titled "Trapezoidal Non-Pneumatic Tire with Supporting and Cushioning Means" to Palinkas and Pajtas; U.S. Pat. No. 4,934,425 to Gajewski et al titled "Non-Pneumatic Tire"; U.S. Pat. No. 5,023,040 to Gajewski et al titled "Method for Making a Polyurethane Non-Pneumatic Tire"; and, Japanese patent appln. Heisei 2-179503 to Hirayama, the disclosures of each of which is incorporated by reference thereto as if fully set forth herein.

In each case, the NPT comprises planar, oppositely directed angulated ribs which intersect at the web, on opposite side faces thereof, and the web maintains inner and outer hoops in radially spaced apart relationship. The NPT is made from an elastomeric material, most preferably, polyurethane. In accordance with this invention, each such NPT is formed integrally with the insert.

The novel insert is referred to as a "central ride insert" or "RI" when the web is centrally located on the surface of the wheel rim in the circumferential center plane of a NPT, as in the '098 and '029 patents.

In any wheeled vehicle, particularly an automobile or truck, an NPT with integrally formed ride insert, referred to by the acronym "NPT/RI" for brevity, serves to enhance the comfort of a "ride" afforded by the NPT without the novel RI. As might be expected, the NPT/RI may be mounted on the rim of any conventional wheel rim or other cylindrical mounting surface, to provide a cushioning effect as the wheel travels over a surface.

As is well known, the comfort of a ride in a wheeled vehicle equipped with a prior art NPT having a solid central web, falls notably short of the comfort afforded by the same vehicle equipped with a state-of-the-art radial pneumatic tire. Though noticeable enough at running speeds on a smooth highway, but deemed a minor drawback, the ride becomes uncomfortable when the running wheel encounters a break in the smooth pavement, or the vehicle is operated on a rough road.

The reason is that on a smooth highway, the distribution of the load is so uniform that the angulated ribs of the NPT absorb and distribute minor shocks first transmitted through the outer hoop. When the wheel encounters an obstacle which generates a major shock, enough of the load is transmitted directly through the web to create a feeling of considerable discomfort. The reason is that the vertical web buckles, because it is essentially incompressible, despite being prevented from bending because of the ribs on either side of the web. Such buckling serves to improve the ride, but it was found that the ride is greatly improved if the major shocks encountered by the wheel can be absorbed better than they are with a conventional central web. The problem is to improve the comfort of the ride afforded by the NPT without decreasing its structural strength and without denigrating its other highly desirable characteristics.

The obvious choice for solving the problem without interfering with the structural configuration of the NPT is to provide it with a thick soft tread. Except that such a tread would have so short an operating life as to be impractical. Any other solution would necessarily have to make some change to the existing structure of the NPT. To insert an elastomeric member into a NPT is conceptually contraindicated because of the known build-up of heat of the NPT in the central zone during operation. Yet we have found that the presence of the RI does not appear to change the existing function of the web as a load-bearing member during normal operation but allows the web also to function as a shock absorber. Because the RI is positioned at the base of the web it is not adversely affected by the heat build-up in the central portion of the NPT; and, because the RI is centrally disposed on the outer surface of a wheel rim on which the NPT is formed, the zone containing the RI ("RI zone") may be vented.

Referring to the '098 and '029 patents, inter alia, it will be evident that the effectiveness with which the NPT distributed the load, was primarily attributable to its unitary annular ("hoop") construction which transmitted and distributed the static and dynamic load throughout the hoop structure, eventually to the inner hoop which was anchored to the wheel rim. Since, in a typical situation, the wheel rim is on a driven wheel of a vehicle, the bond between the inner hoop of the NPT and the surface of the wheel rim on which the NPT is mounted, must be able to withstand the torque generated during operation of the vehicle. This creates a problem of securing the NPT to a wheel rim for use as a road wheel, so that the NPT will not be thrown off by centrifugal force. The solution to the problem is simplified in a conventional NPT because the entire area of the inner hoop (circumferential base of the NPT) is adhesively secured to the circumference of the wheel rim.

To improve the ride of the NPT by cushioning it on the wheel rim, the obvious course was to provide a soft, thick tread on the circumference of the NPT to replace the conventional relatively thin solid hard rubber tread, and also to provide an elastomeric base cushion between the NPT and the wheel rim, which base cushion was more compliant than the NPT. The soft, thick tread certainly improves the comfort of the ride because of the "pillow effect", the thicker and softer the tread, the more comfortable the ride. However, a soft, thick tread decreases the handling and roadworthiness of the vehicle. In addition, the longevity of the tread is drastically foreshortened. For the foregoing reasons, a thicker, softer tread is a poor choice.

The alternative, namely providing a cushioning base ("base cushion") presented serious problems with respect to (i) bonding the NPT to the material of choice for the base cushion, and (ii) tolerating the high torque loading in the base due to acceleration and deceleration of the vehicle, even if the bonding between NPT and base cushion was excellent. This solution, in effect, required finding an elastomer which would provide the desired "cushioning" and at the same time would allow the new elastomer to be effectively bonded to the NPT. This search was immediately recognized as being too-daunting an endeavor. Moreover it is not known how one can choose a base cushion which will meld with the peculiar function of undercut, planar, oppositely disposed angulated "ribs" or "spokes" in the NPT, which provide a construction to ensure the ribs will not bend. Instead of bending, they buckle when the critical load is exceeded. It is this peculiar characteristic cushioning due to compressive deformation of the NPT in normal use, coupled with buckling of the ribs when the critical load is exceeded, which is instrumental in giving the NPT 'ride' and 'handling' characteristics which can come close to mimicking those of a conventional pneumatic tire under normal operating conditions on a smooth highway. No laminate of elastomers is known to provide an operable, let alone reliable and durable, NPT.

This invention is directed to a solution which does not vitiate the durability of the NPT, does not diminish its handling characteristics, yet greatly improves its "ride".

SUMMARY OF THE INVENTION

It has been discovered that when a NPT is integrally formed with a "RI" (ride insert) to provide a NPT/RI, the comfort of the ride in a vehicle equipped with NPT/RIs is enhanced. The enhanced comfort of the ride ("ride enhancement") is believed to be attributable to a cushioning effect of the insert which is more compliant than the NPT. Because the NPT/RI is positioned directly beneath the loadbearing web of a NPT, near its base, the insert is surprisingly tolerant of stress and heat loads generated by operation of the NPT/RI, as will be explained in greater detail herebelow.

It is therefore a general object of this invention to provide a NPT which has been integrally molded over an elastomeric member (or "insert") circumferentially disposed in the same vertical plane as that in which the web of the NPT lies. Preferably, the NPT is integrally molded over a central insert positioned on the circumference of a wheel rim, in a central plane at right angles to the axis of rotation of the wheel rim, in which plane the central web of the NPT also lies.

It has also been discovered that a central elastomeric insert which occupies less than 50% of the area of the NPT's base directly under its central web, and extends vertically through less than one-half the height of the web, enhances the ride of the NPT/RI when it is subjected to overloading, without substantially affecting the deflection of the structure of the NPT itself, as the NPT/RI travels over a flat surface; the improvement in ride is particularly noticeable when the NPT/RI is subjected to a sudden, large impact delivered by driving over a cleat, which impact is sufficiently great to buckle the structure of the NPT itself in the zone immediately above the cleat.

It is therefore a general object of this invention to integrate a prior art NPT of an integrally molded first elastomer, with an annular integrally molded RI of a second elastomer, which second elastomer may have the same chemical structure as the first, or different, provided the RI has a spring rate which is different from that of the web without the RI. The annular RI may be (i) a hollow ring, or (ii) an open or closed cell foam ring, either of which rings may have a cross sectional shape which is arbitrary. The RI is preferably at least as wide as the web above the RI, but less wide than one-half the axial length of the inner hoop. If the second elastomer has the same chemical structure as the first, its physical properties are different. The insert is non-displaceably captured in the web without interfering with the normal function and operation of the NPT, yet, the insert enhances the ride afforded by the NPT without the RI.

It has still further been discovered that any of the foregoing embodiments of an RI, and particularly a ring of porous elastomer, or a tubular ring having a cross-sectional diameter at least as wide as the web above the RI, but less wide than one-half the axial length of the inner hoop, has a surprisingly large effect on the spring rate of the NPT when greatly deflected over a cleat, and a reduction in spring rate when deflected over a smooth laminar surface. An analogous effect is obtained with a tubular ring of natural or synthetic resinous material, such as natural rubber or polyethylene, which ring is at least as wide as the web above the insert, but less wide than one-half the axial length of the inner hoop.

It is still another specific object of this invention to provide a thin-walled rubber tube as the elastomeric insert integrally molded into a polyurethane NPT and substantially encapsulated against the wheel rim by the central web of the NPT. Such a tube has a surprisingly large effect on the spring rate of the NPT when deflected over a cleat, and a reduction in spring rate when deflected over a smooth laminar surface. Most preferred is a natural or synthetic rubber tube having a bore in the range from about 0.1" to about 0.75" (depending mainly on the overall dimensions of the NPT) which tube collapses under a load of 8 oz.

It is a further specific object of this invention to provide an annular disc of synthetic resinous foam positioned vertically in the circumferential central plane of a wheel rim upon which is then spin-molded a polyurethane NPT. The result is a "web-in-web" laminate the central disc of foam, or a gas-permeable porous tube, functioning as the RI, which RI has a surprisingly large effect on the spring rate of the NPT having a solid polyurethane web, that is, without the central disc of foam.

It is the most specific object of this invention to provide a NPT/RI which has performance comparable to a "minispare" currently used in a passenger car. The NPT/RI may also be used in non-automotive applications, for example, caster wheels and luggage cart tires where the circumferential diameter of the NPT/RI is in the range from 6-16", with a tread width in the range from 2"-4" and fork lift truck tires having a circumferential diameter of the NPT/RI up to about 26", with a tread width up to about 7".

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Since in a preferred embodiment, the solid elastomeric material of the NPT is formed into a structure comprising a web and interconnecting oppositely directed ribs which cannot bend but must buckle under compressive loads, it is not surprising that the ride does not truly duplicate that of a pneumatic tire, but only mimics the ride. A specific "elastomeric material" is one having a Shore hardness of 60A to 75D, and a compression modulus (at 0.5 shape factor and 10% compression) of 1000 to 50,000 psi, preferably 80A to 53D and a compression modulus of from 3000 to 10000 psi. Preferred materials are polyurethane, natural rubber, polybutadiene, polyisoprenes, ethylene-propylene-non-conjugated diene terpolymer, copolymers of butadiene with acrylonitrile and with methacrylonitrile, styrenes and acrylates. Most preferred elastomer is polyurethane.

In the most preferred embodiment, the construction of the NPT is an annular body of elastomer having an outer hoop member and an inner hoop member coaxial with the outer hoop. The hoops are connected by a central web in their common central axial plane. Angulated ribs connect the inner and outer hoops on each side of the web, the ribs on one side of the web being oppositely directed relative to those on the other. The ribs are preferably undercut at least near their bases (where they join the inner hoop). The entire NPT is typically molded as a unit directly on a wheel rim after the central elastomeric insert ("RI") is positioned on the surface of the wheel rim. Details of the RNPT, and the TNPT, and methods for making them are disclosed in the aforementioned U.S. Pat. Nos. 4,832,098; 4,921,029; 4,934,425; and 5,023,040, and only essential details to understand and appreciate the scope of this invention will be provided herein.

The most preferred construction of the above-described NPT is illustrated in FIGS. 1, 2, 3 and 4 wherein a NPT, indicated generally by reference numeral 10, is shown mounted on a wheel 12 for rotation about an axis (longitudinal) 14. The NPT 10 comprises an annular body 16 of resilient elastomeric material having an outer cylindrical member ("outer hoop") 18 and an inner cylindrical member ("inner hoop") 22. Inner hoop 22 is coaxial to, and coextensive with outer hoop 18 in the RNPT. In the TNPT, inner hoop 22 is coaxial to, but is not as wide as outer hoop 18 so as to give the TNPT its trapezoidal configuration, seen in cross-section in FIG. 4. The inner hoop 22 is adhered to the outer cylindrical surface 24 of wheel rim member 12. The outer hoop 18 carries, on its outer surface, a rubber tread 20.

Figure 1:
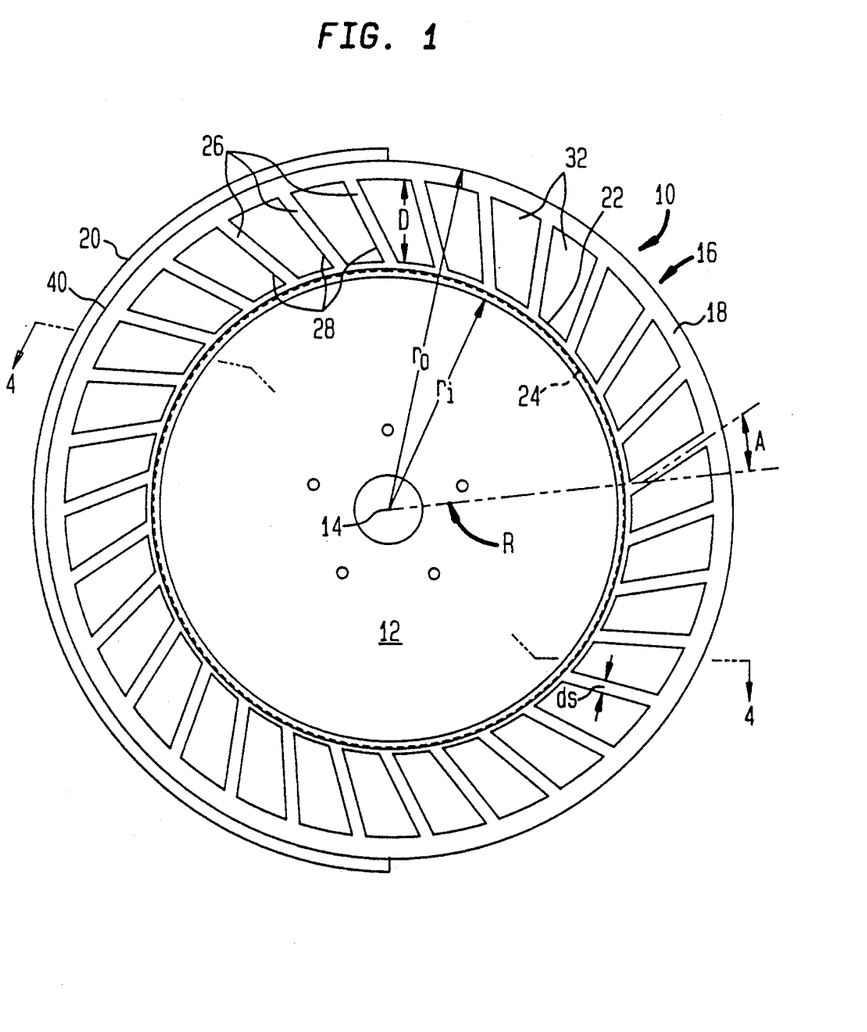
FIG. 1 is a side elevational view of a NPT/RI mounted on a wheel rim, showing the RI in dotted outline intermediate the inner and outer hoops of the NPT, and a portion of the tread broken away.
Figure 2:
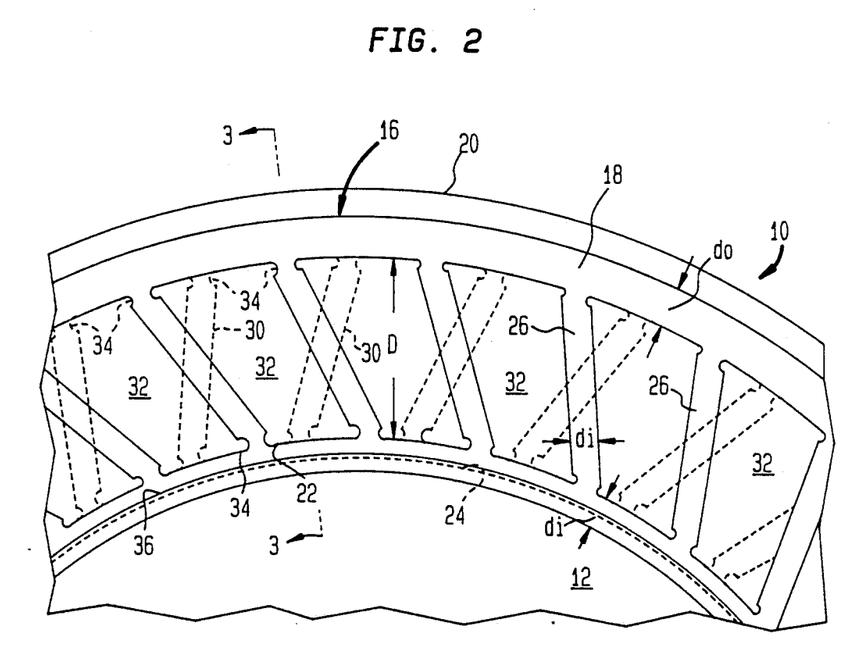
FIG. 2 is a fragmentary side elevational view of a portion of the annular body of the NPT/RI whether it has a generally rectangular cross-section, referred to as a rectangular non-pneumatic tire or RNPT/RI, or a trapezoidal cross-section, referred to as a TNPT/RI, showing the RI in dotted outline intermediate the inner and outer hoops of the NPT, and a portion of the tread.

The outer hoop 18 is supported and cushioned by a plurality of circumferentially spaced-apart front set of angulated ribs 26, a web member ("web") 32, and a rear set of oppositely angulated ribs 30 (shown in dotted outline). Also shown in dotted outline is the RI 40, snugly fitted over the outer cylindrical surface 24 of wheel rim 12 before the RI is captured in the web 32. The web 32 is connected on one side of its side face 32a to ribs 26 of the front set, and the web is connected on its other side face 32b to the rear set of ribs 30.

Figure 3:
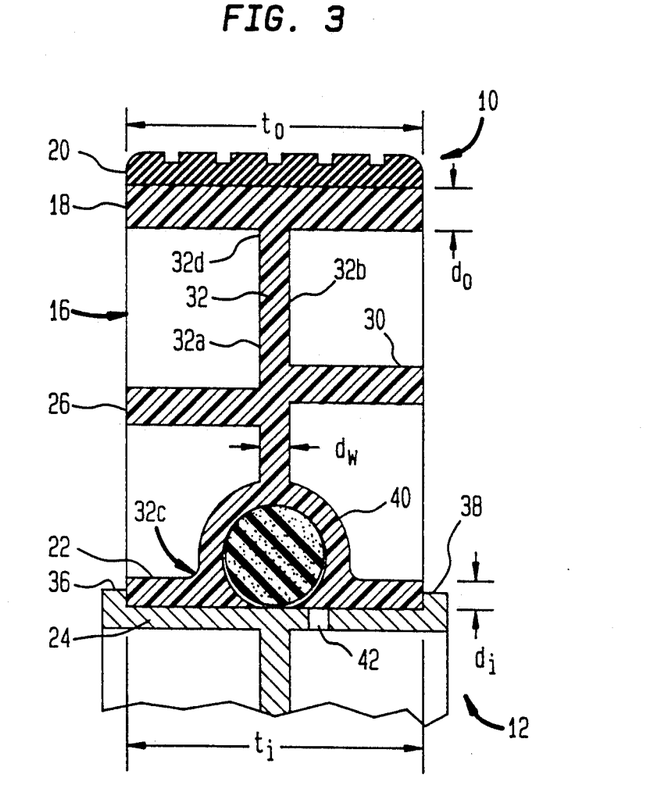
FIG. 3 is a cross-sectional elevational view in a radial plane showing the RNPT/RI under "no-load" conditions, as indicated by the essentially circular cross-section of a foam RI having a circular cross-section.
Figure 4:
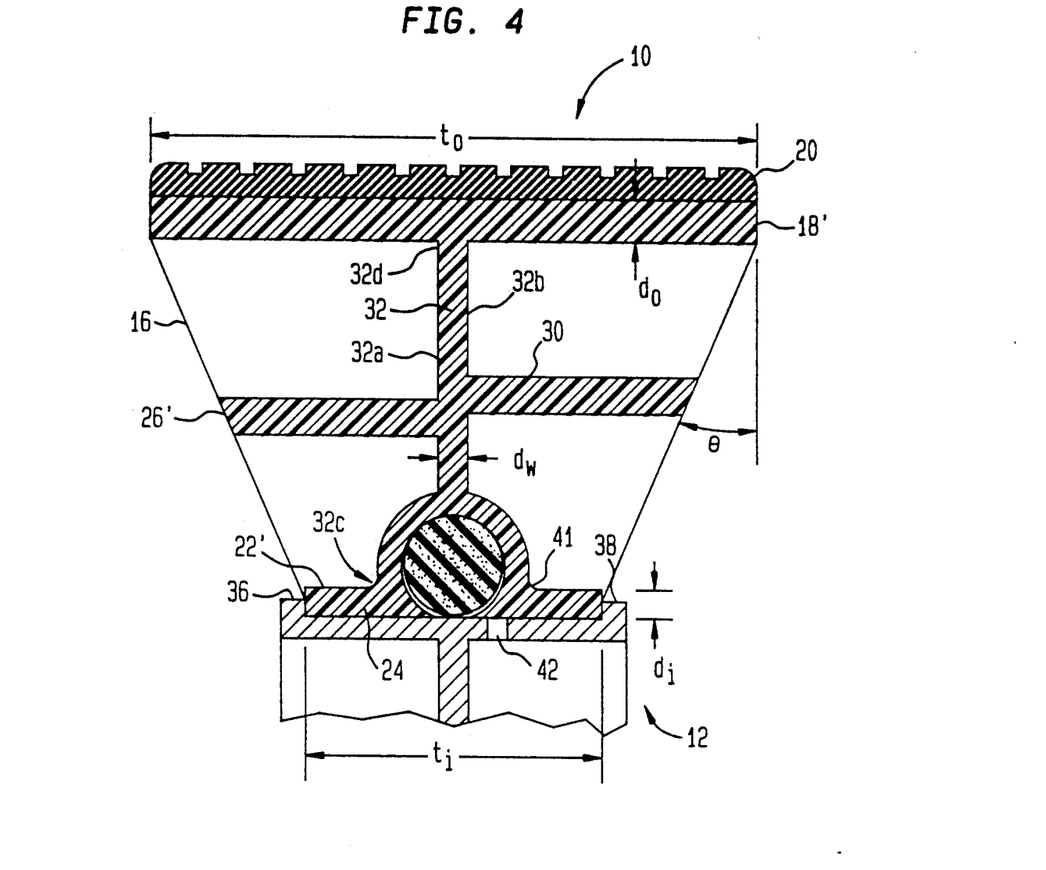
FIG. 4 is a cross-sectional elevational view in a radial plane showing the TNPT/RI under "no-load" conditions, as indicated by the essentially circular cross-section of a thin-walled tubular RI having an annular cross-section.

Referring to FIGS. 3 and 4, it is seen that the planar web member 32 is positioned midway between the axial ends of the inner and outer hoops 18 and 22 for the RNPT; and midway between inner and outer hoops 18' and 22' for the TNPT. Web 32 is connected at its inner periphery 32c to the inner hoop 22 and is connected at its outer periphery 32d to the outer hoop 18 for the RNPT; and to inner hoop 22' and outer hoop 18' for the TNPT. The various rib members 26 and 30 (FIG. 2) of the RNPT are connected at their radially outer ends to the outer hoop 18, and at their radially inner ends to inner hoop 22; and, the ribs of the TNPT are connected at their radially outer and inner ends respectively to the outer hoop 18' and the inner hoop 22'. The ribs 26 and 30 are preferably undercut where their ends connect to the inner and outer hoops as shown at 34, to enhance flexibility of the connections.

The rib members 26 extend generally axially along the inner and outer hoops 22 and 18 (FIG. 3) and, as shown in FIG. 1, are inclined at an angle A in the range from 15° to 75° to radial planes R which intersect them at their junctions with the inner hoop 22. In the specific and most preferred embodiment, the first set of axial ribs 26 and the second axial ribs 30 are each inclined at the same angle to the radial planes R which intersect them at their radially inner ends but the angles of the first ribs 28 are preferably oppositely directed with respect to the radial planes R (FIG. 1) from the angles of the second ribs 30. Thus, as viewed in FIG. 3, the first rib 26 proceeds upwardly from the section lines to connect with the outer hoop 18, while the second rib 30 proceeds downwardly from the section lines to connect with the inner hoop.

The width of the web $d_w$ will depend upon the duty of the NPT, and also the overall dimensions of the NPT designed to serve a specific purpose. For small automobiles weighing about 1000 kg, the web thickness may range from about 2.5–5 mm; and for larger automobiles, light trucks and the like, the web thickness may range from about 4–9 mm.

As illustrated in FIG. 3, a solid ring RI 40 of closed cell polyurethane foam having a bulk density of about 2 lb/ft$^3$ has a diameter greater than $d_w$ and is positioned centrally on the surface 24 of the wheel rim 12. When the TNPT is molded around the RI, the liquid resin flows around the RI and down to the surface 24, encapsulating the RI and forming the inner hoop 22. Simultaneously, ribs 26 and 30 are formed, as is the outer hoop 18 which is of the same length $t_o$ (measured in the longitudinal axial direction) as the length $t_i$ of the inner hoop 22. The wheel rim is provided with projections 36 and 38 to confine the inner hoop 22. The thickness $d_i$ of the inner hoop 22 is preferably less than the thickness $d_o$ of the outer hoop 18 to provide optimum riding qualities in the RNPT. Upon being cured at a temperature lower than that required to liquefy the foam RI (about its glass transition temperature $T_g$), the formation of the RI-encapsulating base with its arched walls helps absorb sudden large impacts of the RNPT/RI. The tread 20 is preferably of a single strip of vulcanized rubber which is provided with a tread pattern designed to improve the traction, tread wear and noise of the rubber tread.

During operation, the heat generated in the RI zone may generate a high enough temperature to affect the physical condition and therefore the performance of the RNPT/RI, if the zone is not adequately cooled. To this end, through passages 42 are provided in the wheel rim to allow air to be pumped through them into the zone containing the RI, to maintain a desirable temperature in the zone. Such holes 42 may be dispensed with if the base of the web does not completely encapsulate the RI, or if the arcuate wall of the base around an encapsulated RI effectively provides sufficient heat transfer to maintain a temperature below melting point or the $T_g$ of the synthetic resinous material used to make the RNPT. Preferably, whether the RI 40 is a closed cell foam, or a tube with either gas-impermeable walls, or walls which are not; or, whether the RI is fully encapsulated by the base of the web, or only partially encapsulated, it is preferable to provide for additional transfer of heat to the ambient air during operation. Most preferably the closed cell foam is a polyurethane or a polyolefin.

As shown in FIG. 3, multiple through-passages (holes) 42 are provided in the wheel rim, preferably staggered on either side of the RI and contiguous to the zone, which passages place the zone in open communication with the ambient air while the wheel is rotating. Since the RNPT/RI is most preferably molded by spincasting using a liquid polyurethane, the holes 42 are plugged with removable plugs of silicone rubber (not shown) while the RNPT/RI is being cast. The plugs are removed after the resin is cured.

In FIG. 4 there is shown a TNPT/RI in which a thin-walled tubular RI 41 of gum rubber is encapsulated within the base of web 32 in a manner analogous to that described for the RNPT/RI of FIG. 3. It will be seen that the trapezoidal shape is the result of outer hoop 18′ being longer ($t_o$) than the inner hoop 22′ ($t_i$). Ribs 26′ and 30′ are oppositely angulated and are connected to the faces 32a and 32b, respectively, of web 32. The radially outer periphery of the web 32 connects the outer hoop 18′ at 32d. As before, the thickness $d_i$ of the inner hoop 22′ is preferably less than the thickness $d_o$ of the outer hoop 18′ to provide optimum riding qualities in the RNPT. Also as before, the resin is cured at a temperature lower than the $T_g$ of the rubber of the RI 41; and upon being cured, plugs (not shown) are removed from multiple passages 42 in the wheel rim, placing the RI in open communication with the atmosphere for cooling air.

Figure 5:
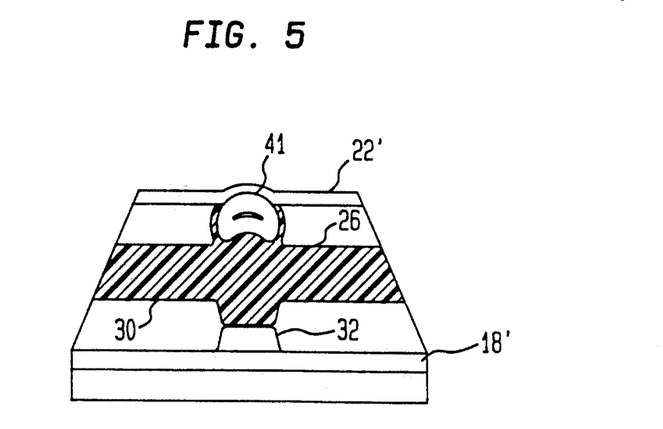
FIG. 5 is a cross-sectional elevational view in a radial plane showing the TNPT/RI of FIG. 4 under high "load" conditions, as indicated by the buckling of the central web upon impact with an essentially planar pavement surface.

Referring to FIG. 5 there is schematically illustrated the effect of a large impact on the TNPT/RI of FIG. 4. The web of the TNPT/RI is buckled, as is evidenced by the bulged radially outer and inner portions of the web 32. Neither the bulge of the radially inner portion, nor the precise relative orientation of the buckled ribs 26′ and 30′ is clearly visible in the FIG.). The magnitude of the impact is such that the RI is crushed, but the zone containing the RI serves to absorb the impact more effectively than the web in the prior art TNPT.

The effect of the relative diameter of the RI to the width of the web has not been quantified, but it will readily be seen that the beneficial effect of the RI will be very small if its diameter is less than $d_w$, and the stiffening effect of the base of the web may be too great if the diameter approaches the width of the inner hoop.

A range of dimensions (in inches) within which an NPT may be made is set forth in the '098 and '029 patents, but the most preferred set of dimensions for a NPT for use on a conventional 15″ wheel rim are provided herebelow:

| Dimension | Minimum | Maximum |
| --- | --- | --- |
| $r_o$ | 9.5 | 10. |
| A | 35° | 45° |
| D | 1.74 | 2.475 |
| $d_i$, $d_o$ | 0.025, 0.1 | 0.06, 0.2 |
| D/$d_w$ | 6.96 | 16.5 |
| D/$d_s$ | 4.97 | 8.54 |
| $t_i$, $t_o$ | 2, 3 | 3, 4 |
| L | 2.124 | 3.5 |
| L/$d_s$ | 12.07 | 6.07 |
| $r_i$ | 7.4 | 7.5 | wherein
$r_o$ is the outer radius of the annular body 16,
A is the angle the ribs 26 make with the radial planes R,
d is the radial thickness of the inner hoop
$d_o$ is the radial thickness of the outer hoop
D is the radial distance from the outer surface of the inner hoop 22 to the inner surface of the outer hoop 18,
$d_w$ is the axial thickness of the web,
$d_s$ is the thickness of the rib member 26 measured perpendicular to its length L,
$t_i$ is the axial thickness of the inner hoop 22,
$t_o$ is the axial thickness of the outer hoop 18, and
$r_i$ is the radius of the inner surface of the inner hoop 22.

The extent to which the RI extends radially upwardly within the central web is a matter of making a desirable compromise between ride comfort and the longevity of the NPT in use. Most preferred is an insert either partially or totally encapsulated in the base of the web. The configuration of the cross-section of the insert is arbitrary, limited by a compromise between load bearing diminution, ride comfort, and longevity in operation.

In the best mode embodiment, the RI is preferably formed as a continuous, preferably tubular hoop or ring, having a bore diameter smaller than the width of the web to be formed above and around it, and the inner diameter of the ring chosen to snugly fit over the wheel rim on which the ring is to be used.

As has been described in greater detail in the aforementioned patents, the NPT/RI is most preferably molded directly onto a wheel rim to get maximum adhesion of the base of the inner hoop to the metal of the wheel rim, particularly if the NPT/RI is to be used on the drive wheels of a vehicle which generates considerable torque. However, in those instances where maximum adhesion is not essential, an NPT/RI may be molded onto a collapsible mandrel and removed as an annular body. The annular body may then be post-fitted to a wheel rim, preferably by first applying an adhesive to bond the NPT/RI to the wheel rim, for use in vehicles which are not provided with a high-torque drive means.

Preferably the ride-insert is positioned on the rim and the NPT cast around the RI which in turn is positioned accurately in the central plane of the mold, so that the RI is locked into position and integrally secured in the NPT.

As stated above, the ring of RI may be formed from a foamed elastomer instead of a solid elastomer; or, the ring may be formed with rubber tubing which is spliced together at its ends and fitted over the rim. The RI is made of material which will not melt at the temperature of the liquid polymer poured into the mold, or dissolve in the polymer. In the best mode, the polymer is a mixture of a polyether glycol prepolymer end-capped with isocyanate groups and an aromatic diamine catalyst, and the ride-insert is a hollow tube of elastomer, typically natural rubber or a polyolefin, having a melting point higher than the temperature of the polymer mixture.

The tube RI is preferably permeable to air, having pores of relatively large diameter but small enough to be impermeable to the liquid polymer used. If the RI is relatively stiff, it is adequately dimensioned to permit a snug fit over the rim of the wheel. It is not essential that the RI be encapsulated on the wheel rim by the elastomeric material of the web, as long as the insert is captured between the web and the wheel rim. Portions of the insert will typically be exposed between ribs in spaces between intersections of oppositely disposed ribs below the central web. Such partial encapsulation of the RI serves to cool the zone containing the RI, particularly if the walls of the RI are gas-permeable.

Figure 6:
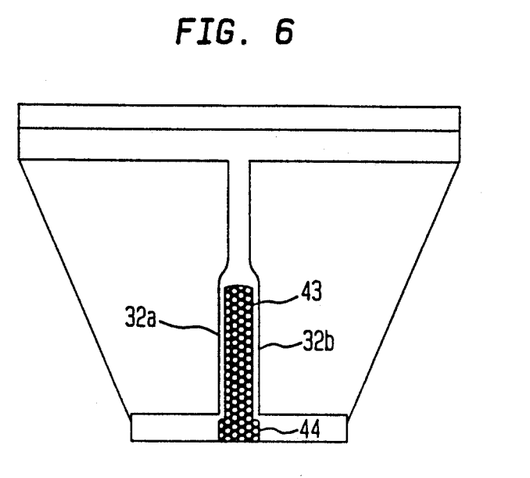
FIG. 6 is a schematic illustration of an essentially annular disc of polyurethane foam which is placed so as to be encapsulated centrally in a web so as to form a web-in-web laminate. The base of the annular disc is slightly enlarged where it is secured to the outer surface of the wheel rim (not shown).
Figure 7:
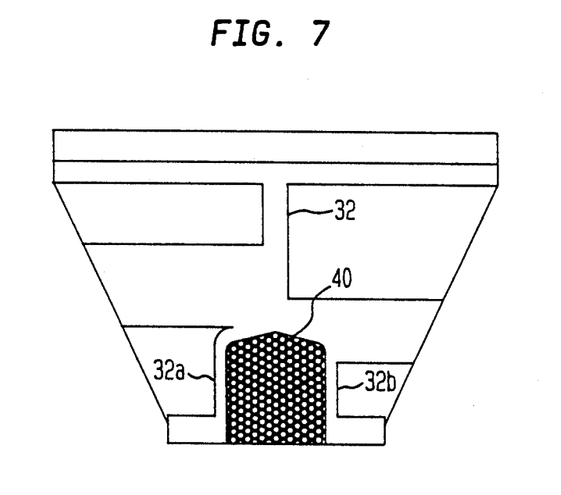
FIG. 7 is a schematic illustration in cross-sectional elevational view in a radial plane, of a TNPT/RI with a generally rectangular RI of foamed polyurethane, the RI having an arched upper surface, with the TNPT/RI under "no-load" conditions.
Figure 8:
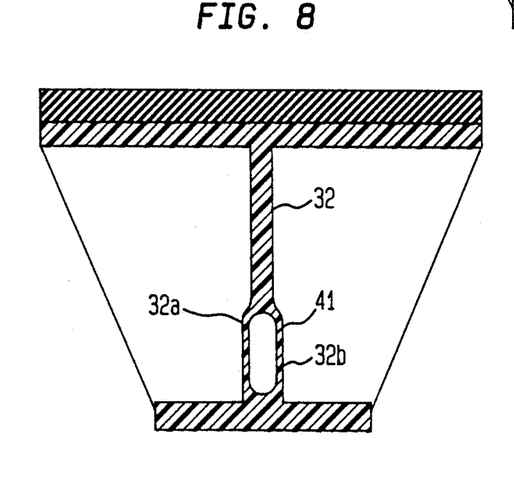
FIG. 8 is a schematic illustration in cross-sectional elevational view in a radial plane, of a TNPT/RI with a thin-walled (approx. 0.0675" thick) tubular insert 0.75" outside diam. and 0.625" inside diam.) which, upon being molded into a TNPT/RI is compressed into an elongated shape 1" high and about 0.2" wide.

As shown in FIG. 6, the RI may be an annular disc 43 which extends no higher than one-half the height of the web 32 in the NPT. After the TNPT is demolded, the RI is laminated as a web-in-web, so that the RI 43 is centered between the webs 32a and 32b which together would add up to the normal thickness of the web $d_w$ deemed necessary to provide the stiffening function of the TNPT. The RI 43 is provided with an enlarged base 44 to facilitate positioning the RI on the wheel rim prior to casting the TNPT/RI. The effect of the web-in-web RI is to decrease the buckling load of the TNPT, compared to that required to buckle a TNPT with a web of thickness $d_w$ but without the RI. It will be recognized that in this general configuration, the radial width of the annular disc could be increased to more than one-half the web height if the buckling characteristics of such a configuration are found to be especially desirable.

The RI, whether an annular disc or a tube, does not function as a pneumatic load-bearing member, but to provide an annular zone under the load bearing portion of the NPT to absorb impact. Under an impact, the spring rate in the central zone of the NPT/RI is substantially different from that of the same zone in a NPT without the RI.

The foregoing is confirmed by finite element analyses as explained in an article titled "Polyurethane Non-Pneumatic Tire Technology—Development and History" by Scott R. Pajtas, presented at the International Congress and Exposition, Detroit, Mich. on Mar. 2, 1990, the disclosure of which is incorporated by reference thereto as if fully incorporated herein. In such analyses, the RI has about the same effect as a void, except of course, there is no known practical way of capturing a void, instead of an RI, in the web of an NPT.

Using a software package commercially available as the ANSYS code from Swanson Analysis Systems, Inc. a finite modelling of the stress concentrations in a NPT with a vertical annular foam RI, was compared with the stress concentrations in a NPT without a RI, that is, with a solid web. The computer-generated results are mapped in color ("stress map") within a "footprint" (pavement contact area) of the tire under load, for Von Mises or equivalent stress (SIGE). In such a map, red represents the highest stress concentration in the range from 89 to 100%, white being next in the range from 78-89%, followed by yellow from 67-78%, white dots on dark blue from 56-67%, light blue from 44-56%, white dots on light blue from 33-44%, dark blue from 22-33%, dark blue dots on white background from 11-22%, and dark green from 0-11%, respectively. Both tires were loaded (in the finite element analysis "FEA" model) at approximately the same load, namely 1046 lb for the NPT and 1024 lb for the NPT/RI. This discrepancy in loading is due to nonlinearities of the tire as well as the numerical approximations which are made within the FEA model.

A comparison of the stress maps shows that, based on 100 being the maximum stress experienced in the NPT, the NPT/RI experienced very little stress concentration in the 89-100% range, and still less in the 78-89% range. In contrast, there are relatively higher stress concentrations in the NPT at both the 89-100% and the 161-184 ranges. It must be concluded that the central region in the NPT has a greater propensity to undue wear than the central region of the NPT/RI. The rest of the footprints in each case are similar in wear, the NPT/RI experiencing slightly more wear in the middle of the "shoulder" portions. Though such a comparison of stress plots does not quantify the amount of wear, nor the time to failure of a tire, they provide a means for estimating the relative tendencies to wear and failure for different portions of the tires.

The presence of the RI has no adverse effect on 'handling' of the vehicle, because of the central position of the RI.

EXAMPLE 1

A TNPT/RI is made by spin-casting in a mold similar to that described in the aforementioned patents. The wheel rim is fitted with a tubular ring of natural gum rubber or poly(vinyl chloride) tubing having an outside diameter of 7/16" and an inner diameter of ⅜", commercially available from Cole Palmer Instrument Co., Chicago, Ill., after the ends of the tubing have been spliced with an adhesive-coated rubber pin having a diameter slightly greater than the bore of the rubber tube. The tube is positioned in the center of the wheel rim's surface so that it will not be displaced when the polyurethane resin is poured into the mold.

The mold is filled with a reaction mixture of (a) preblended prepolymer of 1000 and 2000 molecular weight (nominal number average) polytetramethylene ether glycol (PTMEG) with toluene diisocyanate (TDI) to produce a prepolymer having a NCO/OH ratio of about 2:1, available from Uniroyal Corp as Adiprene. The blend of prepolymers is mixed with 4,4'-methylene-bis(2-chloroaniline) ("MBOCA") in an equivalence ratio of prepolymer to MBOCA in the range from about 90 to 110. The mold is heated to 100° C.

The mold is filled and allowed to cure over a period of 20 minutes, the molded TNPT/RI on the wheel rim is removed and post cured at 100° C. for at least 4 hr.

A tire tread is then adhesively secured to the outer surface of the NPT/RI.

EXAMPLE 2

A second TNPT is made without the RI in the same mold, using the same materials, under the same conditions. This tire is used in comparative tests discussed herebelow.

The following comparative test was run to compare the comfort of the "ride" afforded by (1) a radial tire, specifically a P205/55ZR16 on a 2-door Chevrolet Beretta GTZ, referred to in the Table herebelow as "Radial"; (2) a currently used pneumatic minispare on a 14" wheel rim for the car; (3) a TNPT on a nominal 15" wheel rim with no ride insert, having a 3" tread width, the diameter of the wheel rim being chosen so that the circumferences of the minispare and that of the TNPT are essentially the same; (4) a TNPT/RI with a small tube having an outside diam. of 0.4375" and an inside diam. of 0.3125"; (5) a TNPT/RI with a large tube having an outside diam. of 0.75" and an inside diam. of 0.625".

In the subjective rating system used by a competent ride engineer, based on a scale of 1-10, a rating of 5 represents an acceptable ride. In the Table, the "overall" value is adjusted to emphasize the difference in comfort when compared to the minispare. Therefore, the minispare compared to itself is zero (0). An overall value of −0.5 represents a half unit lower comfort in comparison with that of the minispare. In all cases, the comparison is made by replacing the right rear tire. Each TNPT is provided with the same tread design made and made with the same tread compound.

TABLE 1

| Tire | Overall value |
|---|---|
| Minispare | 0 |
| TNPT (no insert) | −3 |
| TNPT/RI (small tube insert) | −2 |
| TNPT/RI (large tube insert) | −1 |

From the foregoing it is seen that the comfort or the "ride" value of the TNPT/RIs is better than that of the TNPT without the RI and not much worse than the minispare.

The foregoing values are corroborated by physical test data which is objective, as for example in the spring rate on a flat surface (referred to as the "Flat" spring rate $K_f$), and the spring rate over a 0.5" wide cleat, as specified in the Federal Motor Vehicle Safety Standard No. 129 (referred to as the "Line" spring rate $K_l$). Each spring rate is given as in the Table 2 as lbs/inch of deflection).

In the Table 2, Tread A is made of a rubber compound having a Shore A hardness of 86; and tread B has a Shore A hardness of 70. By choosing a different tread compound with lesser hardness, by using a thicker tread, and by using a wider tread, or one with deeper grooves, one may further enhance the "ride" of the NPT/RI.

TABLE 2

| | Tread | Insert | Flat $K_f$ lb/in | Line $K_l$ lb/in |
|---|---|---|---|---|
| TNPT | A | none | 6618 | 2360 |
| TNPT/RI | A | small | 5594 | 1445 |
| TNPT/RI | B | large | 4473 | 1050 |
| Minispare | std. | not appl. | 2033 | 946 |

Since it is well known that the sensitivity of a typical passenger to the line spring rate is much greater than to the flat spring rate, it will now be evident that the TNPT/RI with the large tubular insert provides closely comparable values compared to that of the minispare.

Though the foregoing results are presented for a TNPT/RI, closely comparable results would be obtained with a RNPT/RI since each has a similar load-bearing and cushioning structure to cushion the outer hoop. This structure consisting essentially of plural axially extending, circumferentially spaced-apart rib members connected at their radially inner ends to the outer surface of the inner hoop, and connected at their radially outer ends to the inner surface of the outer hoop. The rib members are generally inclined at substantially equal angles of from about 15° to 75°, more preferably from 20° to 45°, to radial planes which intersect the ribs at their radially inner ends. The web member connects the outer and inner hoops, the web having an upper and a lower portion and opposite side faces, wherein at least said lower portion of the web, and preferably all of it, lies in a circumferential plane at right angles to the axis of rotation of the NPT and wheel rim assembly. The web is connected on its side faces to the rib members, and the RI is captured under and within the web.

As stated hereinabove, the foregoing structure is most preferably produced in a split mold designed for spin casting the NPT/RI using a mixture of isocyanate end-capped prepolymer with a curing agent for the prepolymer, and it is poured into the mold at about 80° C. Any other curable liquid polymer which upon curing will provide the function and desired ride characteristics of a polyurethane may be used, for example a silicone rubber. The mold is shaped to have an internal cavity to form an annular NPT having the structure detailed hereinabove, the base of the NPT being formed on the outer surface of the wheel rim which is placed in the center of the mold cavity. The wheel rim has the RI preferably adhesively secured to it, in the central circumferential plane so that when the NPT/RI is demolded, the RI is captured under the web.

Having thus provided a general discussion of the NPT/RI, described the overall process of making it in detail, and illustrated the invention with specific examples of the best mode of making the NPT/RI it will be evident that the invention has provided an effective solution to the problem of ameliorating the relatively harsh ride of a web-supported NPT. It is therefore to be understood that no undue restrictions are to be imposed by reason of the specific embodiments illustrated and discussed, except as provided by the following claims.

We claim:

1. In a tire and wheel rim assembly rotatable about an axis, comprising an elastomeric non-pneumatic tire effectively bonded to said wheel rim assembly, said non-pneumatic tire having an outer and an inner hoop connected in radially spaced-apart relationship by a web with an upper and a lower portion, and oppositely directed angulated ribs intersecting said web on either side thereof, wherein at least said lower portion of said web lies in a circumferential plane at right angles to the axis of rotation of said tire, the improvement comprising, an elastomeric member or ride-insert non-displaceably captured by said web directly beneath the circumferential center line of said web, in said circumferential plane and integral with said web so as to distribute load on around said insert, said ride-insert occupying less than 50% of the area of said inner hoop, and extending radially through less than one-half the height of said web.

2. The non-pneumatic tire and wheel rim assembly of claim 1 wherein said ride-insert provides a spring rate less than the spring rate of said web without said ride-insert.

3. The non-pneumatic tire and wheel rim assembly of claim 2 wherein said circumferential plane is the same as the central circumferential plane through said tire, and said web lies in said central circumferential plane.

4. The non-pneumatic tire and wheel rim assembly of claim 3 wherein said non-pneumatic tire is formed from a mixture of a polyether glycol prepolymer end-capped with isocyanate groups and an aromatic diamine catalyst, and said ride-insert is a ring of material of arbitrary cross-section, having a melting point higher than the temperature of said mixture.

5. The non-pneumatic tire and wheel rim assembly of claim 4 wherein said ring of material is a hollow tube.

6. The non-pneumatic tire and wheel rim assembly of claim 4 wherein said ring of material is a synthetic resinous foam.

7. In a tire and wheel rim assembly rotatable about an axis, comprising an annular tire body of a first resilient elastomeric material effectively bonded to said wheel rim assembly, said annular tire having a generally cylindrical outer member or "outer hoop" at the outer periphery thereof, a tread carried on the outer surface of said outer hoop, a generally cylindrical inner member or "inner hoop" spaced radially inward from, and coaxial with said outer hoop, a wheel rim member having a generally cylindrical outer surface, means for mounting the inner surface of said inner hoop on the outer surface of said wheel rim in non-rotative bonded engagement therewith, a load-bearing and cushioning structure to cushion said outer hoop, said structure consisting essentially of plural axially extending, circumferentially spaced-apart rib members connected at their radially inner ends to the outer surface of said inner hoop, and connected at their radially outer ends to the inner surface of said outer hoop, said rib members being generally inclined at substantially equal angles of from about 15° to 75° to radial planes which intersect them at their radially inner ends, and a web member connecting said outer and inner hoops, said web having an upper and a lower portion and opposite side faces, wherein at least said lower portion of said web lies in a circumferential plane at right angles to said axis of rotation, and said web is connected on its side faces to said rib members, the improvement comprising, an elastomeric member or "ride insert" non-displaceably captured by said web directly beneath the circumferential center line of said web, in said circumferential plane and integral with said web so as to distribute load on around said insert, said ride insert occupying less than 50% of the area of said inner hoop on said wheel rim's surface, and extending vertically through less than one-half the height of said web.

8. The non-pneumatic tire and wheel rim assembly of claim 7 wherein said ride-insert provides a spring rate less than the spring rate of said web without said ride-insert.

9. The non-pneumatic tire and wheel rim assembly of claim 8 wherein said circumferential plane is the same as the central circumferential plane through said tire, and said web lies in said central circumferential plane.

10. The non-pneumatic tire and wheel rim assembly of claim 9 wherein said non-pneumatic tire is formed from a mixture of a polyether glycol prepolymer end-capped with isocyanate groups and a catalyst for curing said prepolymer, and said ride-insert is a ring of material of arbitrary cross-section, having a melting point higher than the temperature of said mixture.

11. The non-pneumatic tire and wheel rim assembly of claim 10 wherein said ring of material is a hollow tube.

12. The non-pneumatic tire and wheel rim assembly of claim 10 wherein said ring of material is a synthetic resinous foam.

13. The non-pneumatic tire and wheel rim assembly of claim 11 wherein said non-pneumatic tire has a trapezoidal cross-section.

14. The non-pneumatic tire and wheel rim assembly of claim 11 wherein said non-pneumatic tire has a rectangular cross-section.

15. The non-pneumatic tire and wheel rim assembly of claim 10 wherein said ring is permeable to air.

16. The non-pneumatic tire and wheel rim assembly of claim 15 wherein said rim is provided with through-passages placing said ring in open communication with the atmosphere.

17. In a method of molding a non-pneumatic tire on the outer surface of a wheel rim rotatable about an axis, comprising casting a curable liquid polymer into a mold having an internal cavity shaped to form an annular body having a central unitary circumferential web member, confining said liquid polymer in said cavity around said outer surface, curing said polymer and demolding said non-pneumatic tire, the improvement comprising, prior to casting said curable liquid polymer, securing a ring of elastomeric material as a ride insert non-displaceably captured by said web directly beneath the circumferential center line of said web, on said outer surface centrally in the circumferential plane thereof, and integral with said web so as to distribute load on around said insert.

18. The method of claim 17 wherein said polymer is a mixture of a polyether glycol prepolymer end-capped with isocyanate groups and a catalyst for curing said prepolymer, and annular body consists essentially of an outer hoop at the outer periphery thereof, an inner hoop spaced radially inward from and coaxial with said outer hoop, a plurality of axially extending, circumferentially spaced-apart first and second ribs connected at their corresponding inner and outer ends to said inner and outer hoops, said ribs being generally inclined at substantially equal angles of about 15° to 75° to radial planes which intersect them at their inner ends; said web member has opposite side faces, and its inner and outer peripheries connected respectively to said inner and outer hoops; said web member being connected on one side face to said first rib members and on the other side face to said second rib members, said first ribs being directed oppositely to said second ribs with respect to said radial planes, to form, with said inner and outer hoops and said web member, a load-bearing structure which provides locally loaded members adapted to buckle.

19. The method of claim 18 wherein said ride insert is a hollow tube of elastomeric material selected from the group consisting of natural rubber and a synthetic resinous material.

20. The method of claim 18 wherein said ride insert is a closed cell foam selected from the group consisting of a polyurethane and a polyolefin.

* * * * *